United States Patent
Nakamura et al.

(10) Patent No.: US 7,440,222 B2
(45) Date of Patent: Oct. 21, 2008

(54) MAGNETIC RECORDING APPARATUS AND POSITIONING CORRECTION METHOD

(75) Inventors: Hiroaki Nakamura, Kanagawa (JP); Shinji Takakura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 304 days.

(21) Appl. No.: 11/368,734

(22) Filed: Mar. 6, 2006

(65) Prior Publication Data
US 2007/0070852 A1 Mar. 29, 2007

(30) Foreign Application Priority Data
Sep. 28, 2005 (JP) ............................. 2005-283069

(51) Int. Cl.
*G11B 5/596* (2006.01)
(52) U.S. Cl. .................................. 360/77.04
(58) Field of Classification Search .............. 360/77.04
See application file for complete search history.

(56) References Cited

U.S. PATENT DOCUMENTS

| | | | | |
|---|---|---|---|---|
| 5,986,847 A * | 11/1999 | Le et al. | .................... | 360/77.08 |
| 6,008,962 A * | 12/1999 | Le et al. | .................... | 360/77.04 |
| 6,049,440 A * | 4/2000 | Shu | .......................... | 360/77.04 |
| 6,144,517 A * | 11/2000 | Watanabe et al. | ........... | 360/77.04 |
| 6,493,173 B1 * | 12/2002 | Kim et al. | ................. | 360/77.04 |
| 6,765,748 B2 * | 7/2004 | Shu | .......................... | 360/77.04 |
| 6,970,320 B2 * | 11/2005 | Sugiyama et al. | ........ | 360/77.04 |
| 7,082,008 B2 * | 7/2006 | Ashikaga et al. | .......... | 360/77.04 |
| 7,123,433 B1 * | 10/2006 | Melrose et al. | ........... | 360/77.04 |
| 7,173,788 B2 * | 2/2007 | Nakamura et al. | ........ | 360/77.08 |
| 7,262,931 B2 * | 8/2007 | Nakamura et al. | ........ | 360/77.02 |
| 7,265,930 B2 * | 9/2007 | Nakamura et al. | ........ | 360/77.08 |
| 2005/0128632 A1 | 6/2005 | Nakamura et al. | | |
| 2007/0230016 A1 * | 10/2007 | Nakamura | ............... | 360/77.08 |

FOREIGN PATENT DOCUMENTS

| | | |
|---|---|---|
| JP | 08-293110 | 11/1996 |
| JP | 09-045025 | 2/1997 |
| JP | 10-040523 | 2/1998 |
| JP | 2000-123506 | 4/2000 |
| JP | 2001-243611 | 9/2001 |
| JP | 2005-166115 | 6/2005 |

OTHER PUBLICATIONS

Chinese Office Action dated Feb. 22, 2008 corresponding to U.S. Appl. No. 11/368,734, filed on Mar. 6, 2006.

* cited by examiner

*Primary Examiner*—Hoa T Nguyen
*Assistant Examiner*—James L Habermehl
(74) *Attorney, Agent, or Firm*—Amin, Turocy & Calvin, LLP

(57) ABSTRACT

A magnetic recording apparatus includes a composite magnetic head which includes a recording head and a reproducing head; a magnetic storage medium; a discrete area; and a correction information recording area. Positioning correction information is able to be written in the correction information recording area at each track center. The apparatus also includes a center shift amount detection area. Center shift amount detection information is previously recorded in the center shift amount detection area. The center shift amount detection information is for measuring a center shift amount which indicates a relative distance between a tracking center and an actual track center of the discrete area when either the recording head or the reproducing head is positioned at a track center.

14 Claims, 14 Drawing Sheets

DISCRETE TRACK CENTER
IN THE CASE WHERE SERVO PATTERN IS IDEALLY
TRANSFERRED TO SERVO AREA

HEAD POSITIONING CENTER BY SERVO PATTERN — CENTER SHIFT AMOUNT

DISCRETE TRACK CENTER
IN THE CASE WHERE TRANSFER ERROR
IS GENERATED IN SERVO PATTERN

NO HEAD SKEW ANGLE

WITH HEAD SKEW ANGLE

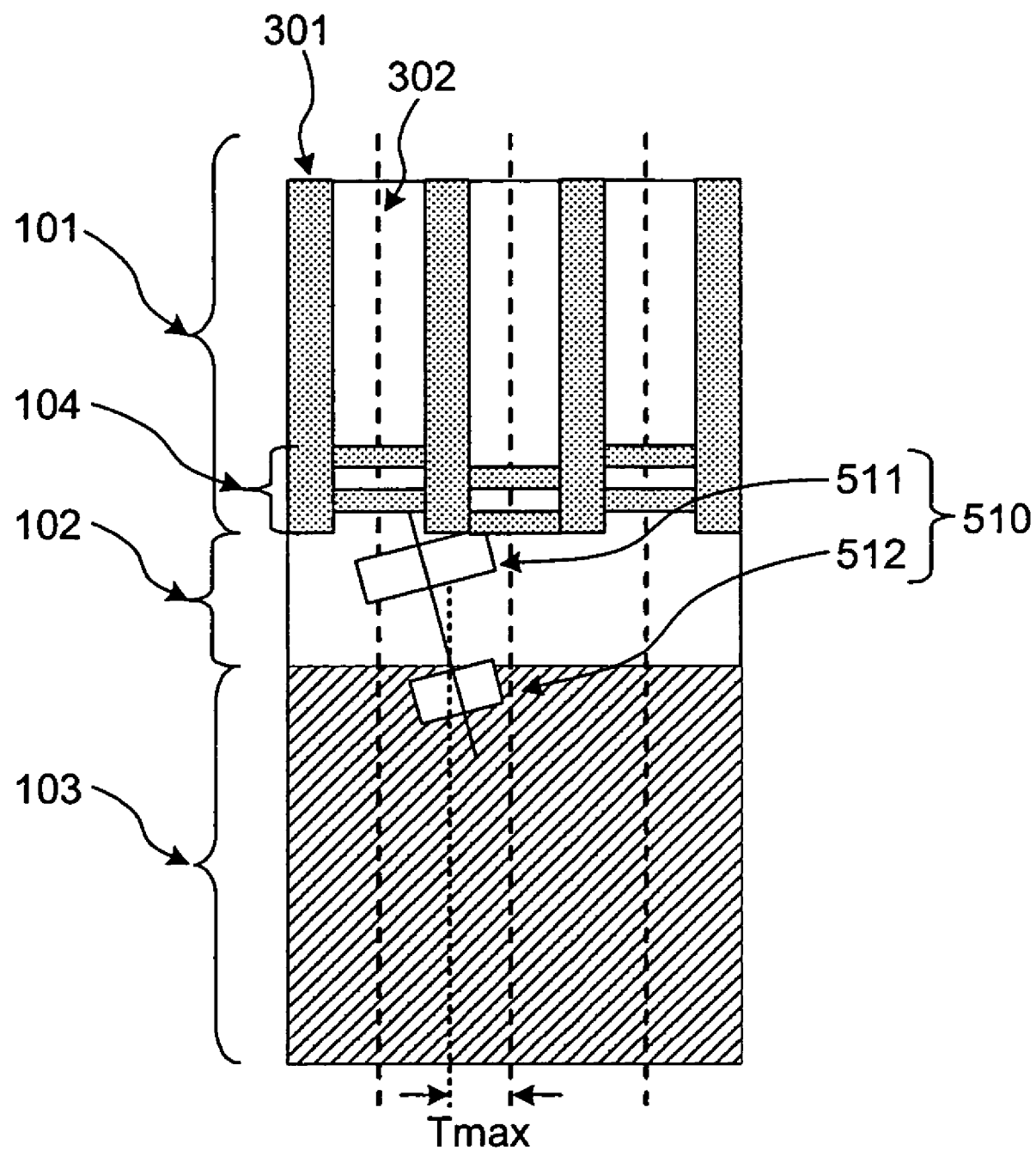

| TRACK NUMBER | SECTOR NUMBER | OFFSET AMOUNT |
|---|---|---|
| 1 | 1 | a1 |
| | 2 | a2 |
| | 3 | a3 |
| | ... | ... |
| | n | an |
| 2 | 1 | b1 |
| | 2 | b2 |
| | 3 | b3 |
| | ... | ... |
| | n | bn |
| ... | ... | ... |

MAGNETIC RECORDING APPARATUS AND POSITIONING CORRECTION METHOD

CROSS-REFERENCE TO RELATED APPLICATIONS

This application is based upon and claims the benefit of priority from the prior Japanese Patent Application No. 2005-283069, filed on Sep. 28, 2005; the entire contents of which are incorporated herein by reference.

BACKGROUND OF THE INVENTION

1. Field of the Invention

The present invention relates to a magnetic recording apparatus and a positioning correction method in which a discrete track type magnetic storage medium provided with a discrete area is used. The discrete area includes plural tracks and a non-magnetic area located between the adjacent tracks. The track has a magnetic recording area in which data can be written and a non-magnetic area, and the data cannot be written in the non-magnetic area.

2. Description of the Related Art

Recently, as a storage capacity of a computer is increased, the storage capacity tends to be increased in the magnetic recording apparatus such as a hard disk drive (HDD). In order to achieve the large storage capacity of the magnetic recording apparatus, it is necessary to achieve a finer recording magnetic domain string in a magnetic recording layer to perform the high-density recording. The recording magnetic domain string is formed by a signal magnetic field generated from a magnetic head. A perpendicular magnetic recording method has been known as one of the high-density recording methods.

In the perpendicular magnetic recording method, the recording is performed by producing magnetization in a direction perpendicular to a recording layer surface of the magnetic recording medium. However, in the perpendicular magnetic recording method, when the recording density is not lower than 100 Gbit/in$^2$, a writing operation to an adjacent track is performed by side fringing generated from a side face of the magnetic head, which results in a problem that a recording failure and a reproduction failure are generated.

Therefore, there is proposed a so-called discrete track type magnetic recording medium, in which the non-magnetic area made of a non-magnetic material is formed in a circumference direction of the recording layer of the magnetic recording medium and the data is recorded only in the magnetic recording area made of the magnetic material. According to the discrete track type magnetic recording medium, since the non-magnetic area is provided between the tracks, there is an advantage that the data can be prevented from being written in the adjacent track to realize good recording and reproducing characteristics.

Usually a composite head is used in the conventional magnetic recording apparatus. In the composite head, a recording head for writing the data in the magnetic recording medium and a reproducing head for reading the data from the magnetic recording medium are mounted on the same slider. In a rotary type drive structure, the composite head is supported at a leading end of a head actuator, the composite head is moved in a radial direction in which the composite head cuts across the track of the magnetic recording medium, and the composite head is controlled so as to be positioned at the desired sector. A servo area is provided at constant intervals in a track direction in a recording surface of the magnetic recording medium. Position information such as a track position and a sector position is recorded in the servo area.

A first portion whose surface is the effective magnetic recording portion and a second portion whose surface is not the effective magnetic recording portion are formed in the magnetic recording medium having the discrete track structure. The first portion is a projected magnetic area in which a magnetic film is provided. The second portion is the non-magnetic area or the recessed area in which the magnetic recording cannot be performed. That is, even if the magnetic film is formed in the second portion, the second portion is substantially formed as the non-magnetic area because the second portion is recessed.

In the magnetic recording medium having the discrete track structure, the servo area in which servo data is recorded can be embedded in the magnetic recording medium without using a usual servo track writer.

In addition to the sector and the track address, the servo data includes a servo pattern for detecting position deviation in the track (hereinafter referred to as "deviation detection servo pattern"). Examples of the deviation detection servo pattern include a burst type servo pattern and a phase difference type servo pattern.

One of modes of the phase difference type servo pattern is a pattern including straight lines oblique to the data track. According to a servo signal processing method, there are the mode provided with the unidirectional oblique pattern and the mode provided with both the forward oblique pattern and the reversely oblique pattern.

However, in the conventional technique, the servo pattern determined from a positional relationship between a rotation center of an arm and the head is embedded in the magnetic recording medium. Therefore, in the case where the ideal servo pattern previously assumed and the head are shifted from each other, sometimes the data cannot accurately be written and read because a head positioning center by the servo pattern is shifted from the center of the discrete track in which the data is recorded.

It is necessary that the center in positioning the head with the ideally embedded servo pattern, i.e., the tracking center coincide with the center of the discrete track in which the data is written and read. However, in the case where a transfer error is generated in transferring the servo pattern to a substrate during a magnetic recording medium production process, the tracking center does not coincide with the center of the discrete track, and the head is positioned while shifted from the center of the discrete track even if the head is in the tracking state. This causes the problem that sometimes the data cannot be written and read at the position where an error rate is lower than an allowable range.

For the phase difference type servo pattern provided with the servo pattern including the straight lines oblique to the data track, the servo pattern having an oblique angle determined from the positional relationship between the rotation center of the arm and the head is embedded in the magnetic recording medium. The shift is generated between the original head angle and the pattern angle by an influence of a head attachment error or the like, which results in the problem that the shift is generated in the tracking center.

For example, as disclosed in Japanese Patent Application Laid-Open No. 2000-123506, in order to correct the shift of the relative angle between the head angle and the pattern angle, the conventional phase difference type servo pattern is provided with the forward oblique pattern and the reversely oblique pattern to release the tracking shift using a servo signal in which the forward oblique pattern is reproduced and a signal in which the reversely oblique pattern is reproduced.

This is because the influences of the opposite angle shifts emerge in the servo signal and the signal.

However, since two kinds of the servo patterns, i.e. the forward oblique servo pattern and reversely oblique servo pattern are provided in the conventional technique, an area of the servo area is increased compared with the normal magnetic recording medium, which results in the problem that the recording density of the magnetic recording medium cannot be improved.

SUMMARY OF THE INVENTION

According to one aspect of the present invention, a magnetic recording apparatus includes a composite magnetic head which includes a recording head and a reproducing head; and a magnetic storage medium in which data is recorded, the magnetic storage medium including a discrete area, having a plurality of tracks and a non-magnetic area between adjacent tracks, the tracks having a magnetic recording area where data can be written by the recording head, the data not being able to be written in the non-magnetic area by the recording head in the non-magnetic area, a correction information recording area, positioning correction information being able to be written in the correction information recording area used for positioning either the recording head or the reproducing head at each track center, and a center shift amount detection area, center shift amount detection information being previously recorded in the center shift amount detection area, the center shift amount detection information being for measuring a center shift amount which indicates a relative distance between a tracking center and an actual track center of the discrete area when either the recording head or the reproducing head is positioned at a track center.

According to another aspect of the present invention, a positioning correction method includes reading center shift amount detection information with a reproducing head while a reproducing head is moved by a predetermined distance in a radial direction from a position where the reproducing head is positioned at a predetermined track in a discrete track type magnetic storage medium, the discrete track type magnetic storage medium including a discrete area, a correction information recording area, and a center shift amount detection area, the discrete area having a plurality of tracks and a non-magnetic area between the adjacent tracks, the track having a magnetic recording area where data can be written by the recording head, the data not being able to be written in the non-magnetic area by the recording head in the non-magnetic area, positioning correction information being able to be written in the correction information recording area when either the recording head or the reproducing head is positioned at each track center, center shift amount detection information being previously recorded in the center shift amount detection area, the center shift amount detection information for measuring a center shift amount which is of a relative distance between a tracking center and an actual track center of the discrete area when either the recording head or the reproducing head is positioned at each track center; and moving the reproducing head and the recording head and reading the center shift amount detection information a plurality of times, and determining the positioning correction information based on the center shift amount detection information read.

BRIEF DESCRIPTION OF THE DRAWINGS

FIG. 8 is an explanatory view showing a state in which the magnetic head is moved toward an inner circumference direction by a distance Tmax from the track center indicated by a reproducing head;

DETAILED DESCRIPTION OF THE INVENTION

A magnetic recording apparatus and a positioning correction method of a preferred embodiment according to the invention will be described in detail below with reference to the accompanying drawings. In the embodiment, the magnetic recording apparatus and positioning correction method of the invention are applied to the hard disk drive (HDD) provided with a hard disk (HD) which is of the magnetic recording medium and the positioning correction of a composite magnetic head in HDD respectively.

A structure of the hard disk according to the embodiment will first be described. The hard disk of the embodiment has the structure in which an offset amount measurement area is provided in a radial direction between the discrete area and the servo area. An offset amount is measured in the offset amount measurement area, and the offset amount is a relative distance in a storage-medium radial direction between the reproducing head and the recording head.

Figure 1:
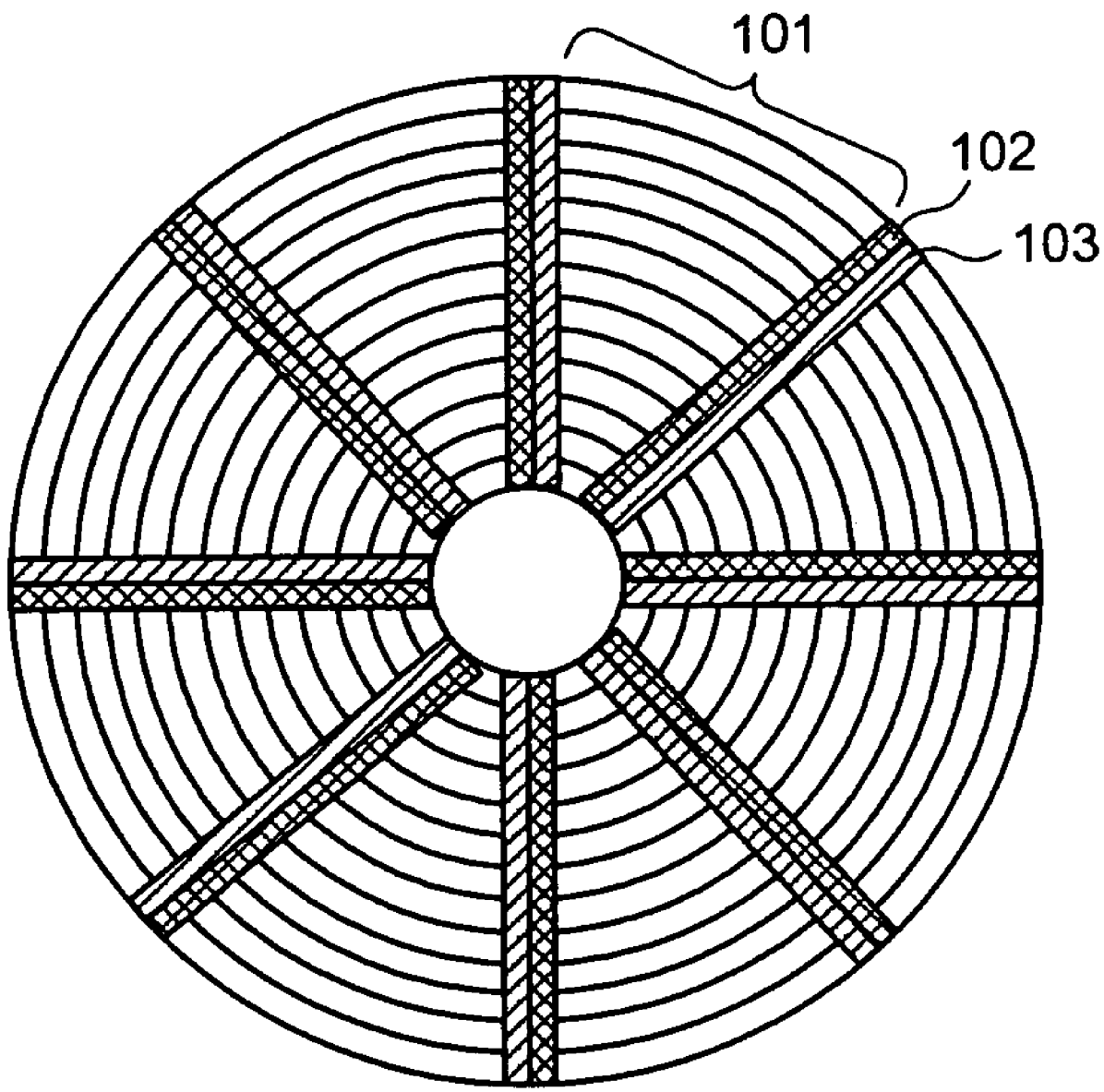
FIG. 1 is a schematic view showing a structure of a hard disk according to an embodiment.

FIG. 1 is a schematic view showing the structure of the hard disk of the embodiment. The hard disk of the embodiment is a discrete track type hard disk in which a non-magnetic area is provided between the recording areas in each track. Each sector includes a discrete area 101, a servo area 103, and a correction information recording area 102.

The discrete area 101 has the recording area and the non-magnetic area located between the recording areas in each track. The data cannot be written in the non-magnetic area. The hard disk of the embodiment has the structure in which the later-mentioned center shift amount detection information area is provided in the recording area of the discrete area 101.

Servo data is recorded in the servo area 103. The servo data includes a track number and a sector number, which are of sector address information, synchronization information, and off-track amount detection information. The servo pattern including a magnetic portion and a non-magnetic portion is formed in the servo area 103.

A positioning correction amount is recorded in the correction information recording area 102 in performing the positioning control of each of the reproducing head and the recording head in HDD. The correction information recording area 102 is provided in the radial direction between the discrete area 101 and the servo area 103. The servo area 103 and the correction information recording area 102 are provided in each sector.

Figure 2:
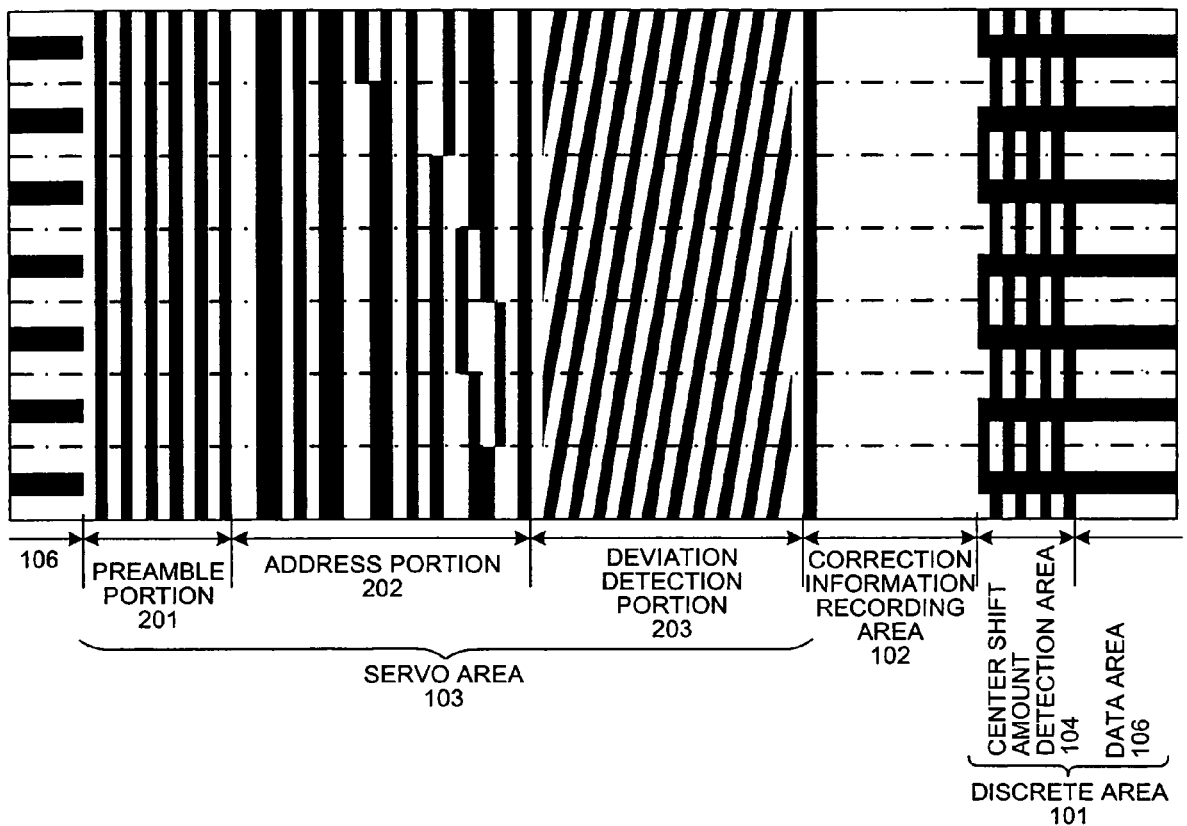
FIG. 2 is a schematic view showing a detailed structure of a discrete area and a servo area in the hard disk of the embodiment.

FIG. 2 is a schematic view showing a detailed structure of the discrete area 101 and the servo area 103 in the hard disk of the embodiment. In FIG. 2, alternate long and short dash lines indicate the track center position.

Referring to FIG. 2, the servo area 103 includes a preamble portion 201, an address portion 202, and a deviation detection portion 203.

The information for synchronizing a reproducing clock with a disk pattern is recorded in the preamble portion 201 of the servo area 103. The information on cylinder and sector addresses and the like is recorded in the address portion 202. The information for detecting the off-track amount from the track center of the head is recorded in the deviation detection portion 203. As shown in FIG. 2, phase difference type servo patterns are formed in the deviation detection portion 203. The phase difference type servo pattern is a linear pattern in which the magnetic material portion is oblique to the tracks in a data area 106 with a constant angle.

Figure 3:
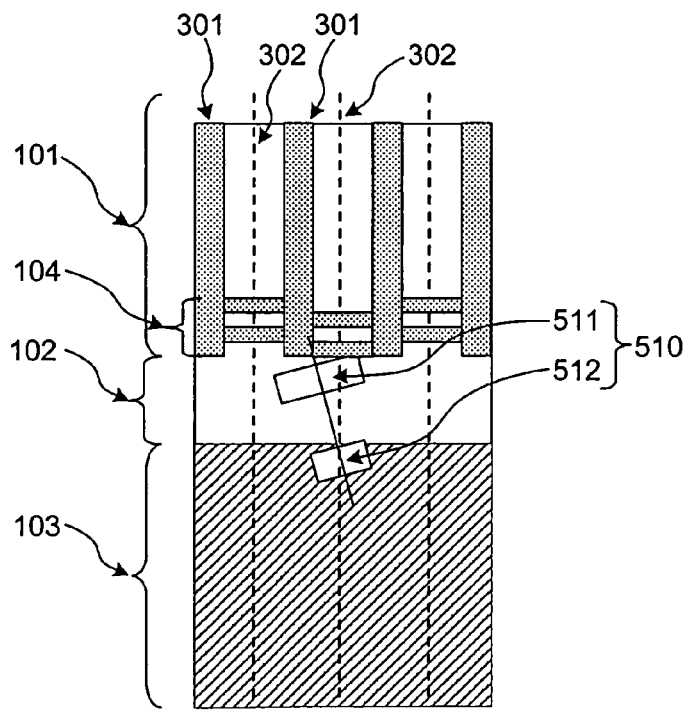
FIG. 3 is a schematic view showing a state in which a magnetic head is positioned at the servo area.

FIG. 3 is a schematic view showing a state in which a magnetic head 510 is positioned at the servo area 103. The discrete area 101 includes a recording area 302 and a non-magnetic area 301. The recording area 302 is made of the magnetic material in which the data can be written by the recording head. The non-magnetic area 301 is provided between the tracks, i.e., the recording areas 302, and the data cannot be written by the recording head in the non-magnetic area 301. A part of the correction information recording area 102 is made of the magnetic material in which the data can be written, and the non-magnetic area may be neglected in the correction information recording area 102.

A center shift amount detection area 104 is used to detect a shift amount between a tracking center position and an actual central position of the track of the discrete area 101 (hereinafter referred to as "discrete track"). The tracking center position is the position when the head is positioned at the track center position in the servo area 103. The center shift amount detection area 104 is previously formed in the recording area 302 of the discrete area 101 to which the correction information recording area 102 is adjacent in a head running direction, i.e., in the circumferential direction. The center shift amount detection areas 104 located in adjacent tracks are formed in a checkered pattern while phases are shifted from each other by 180 degrees.

The composite head in which a recording head 511 and a reproducing head 512 are separated from each other is used as the magnetic head 510 in the embodiment. Referring to FIG. 3, the reproducing head 512 is positioned at the track center position. Each cylinder of the hard disk is formed in the disk shape as shown in FIG. 1 and a locus of the moving magnetic head makes an arc, so that a relative distance (offset amount) between the reproducing head 512 and the recording head 511 in the radial direction of the hard disk is changed in each track. In the embodiment, a positioning correction amount is recorded in the correction information area 102. The positioning correction amount is used to position the reproducing head 512 and the recording head 511 with respect to the discrete track center respectively.

However, a servo pattern determined from the positional relationship between the rotation center of an arm and the magnetic head 510 is embedded in the hard disk. Therefore, in the case where the previously assumed ideal pattern is shifted from the position of the magnetic head 510, even if the magnetic head 510 is positioned at the track center using the positioning correction amount, the head positioning center position by the servo pattern is shifted from the discrete track center position, and sometimes the data cannot accurately be written and read.

Figure 4A:
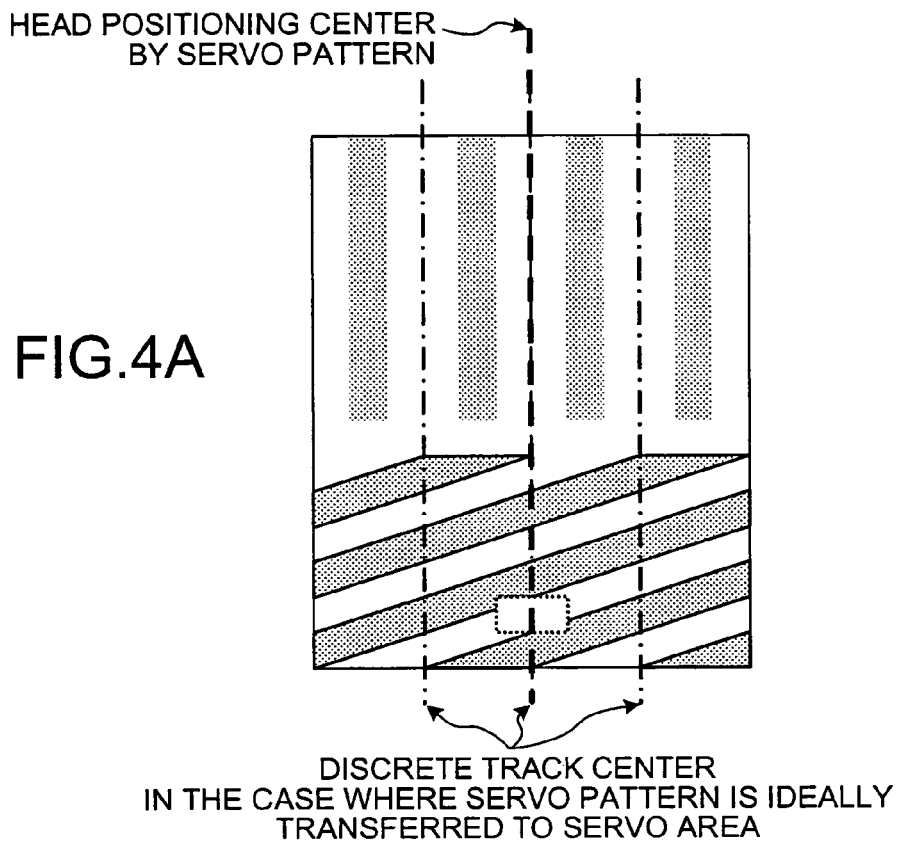
FIG. 4A is a schematic view showing a relationship between a head positioning tracking center by a servo pattern and a discrete track center in the case where the servo pattern is ideally transferred to the servo area.
Figure 4B:
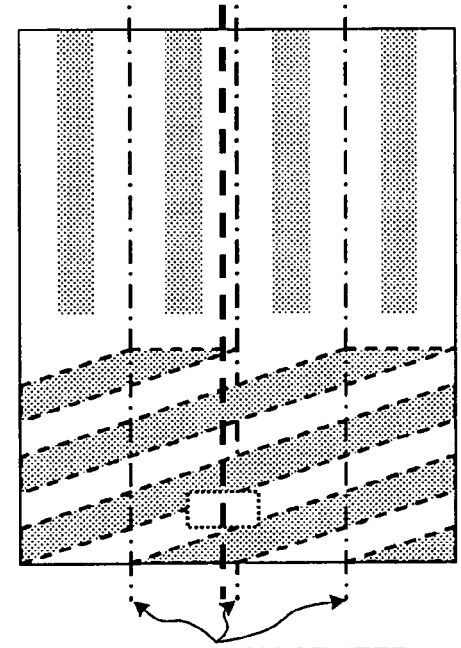
FIG. 4B is a schematic view showing a relationship between the head positioning tracking center by the servo pattern and the discrete track center in the case where a transfer error is generated in the servo pattern.

FIG. 4A is a schematic view showing the relationship between the head positioning tracking center by the servo pattern and the discrete track center in the case where the servo pattern is ideally transferred to the servo area 103. FIG. 4B is a schematic view showing the relationship between the head positioning tracking center by the servo pattern and the discrete track center in the case where a transfer error is generated in the servo pattern.

As shown in FIG. 4A, in the case where the servo pattern is ideally transferred to the servo area 103, the head positioning tracking center by the servo pattern coincides with the discrete track center. However, in the case where the transfer error is generated in the servo pattern, the head positioning tracking center by the servo pattern is shifted from the discrete track center. Therefore, the magnetic head 510 is positioned while shifted from the discrete track center even if the magnetic head 510 is in the tracking state, and sometimes the data cannot be written and read at the position where the error rate is within the allowable range.

The servo pattern having an oblique angle determined from the rotation center of the arm and the magnetic head 510 is embedded in the case of the servo area 103 in which the phase difference type servo pattern, which is of the servo pattern including the straight line oblique to the tracks of the data area 106, is recorded like the hard disk of the embodiment. The shift is generated between the original head angle and the pattern angle by the influence of the head attachment error or the like, which results in the problem that the shift is generated in the tracking center.

Figure 5A:
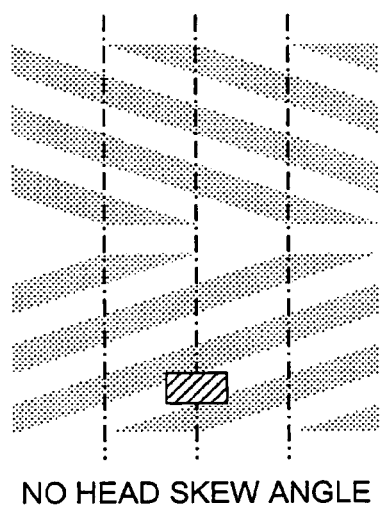
FIG. 5A is a schematic view showing a state in which the head scans with no skew angle on the servo pattern including a forward oblique patter and a reversely oblique patter.
Figure 5B:
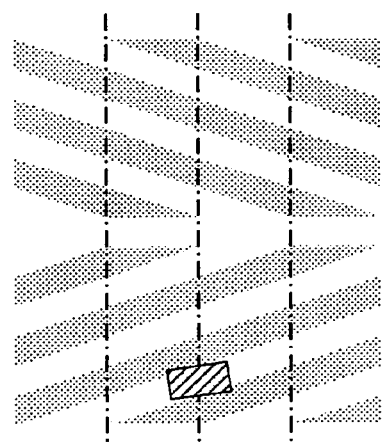
FIG. 5B is a schematic view showing a state in which the head scans with a skew angle on the servo pattern including the forward oblique patter and the reversely oblique patter.
Figure 5C:
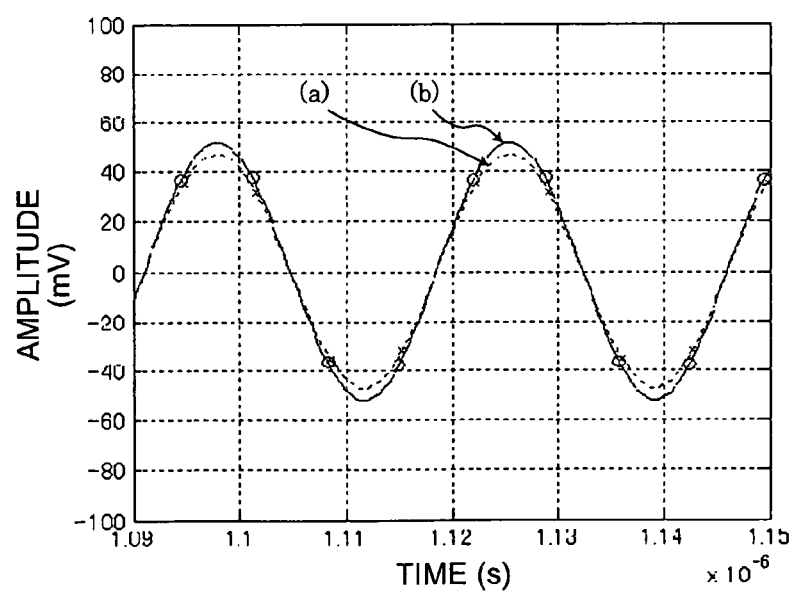
FIG. 5C is a graph showing reproduction signals in the cases shown in FIGS. 5A and 5B.

It is also thought that the shift is corrected in the relative angle between a head skew angle and a pattern angle by forming the servo pattern with a forward oblique pattern and a reversely oblique pattern. FIG. 5A is a schematic view showing the state in which the magnetic head 510 scans with no skew angle on the servo pattern including the forward oblique patter and the reversely oblique patter, FIG. 5B is a schematic view showing the state in which the magnetic head 510 scans with a skew angle on the servo pattern including the forward oblique patter and the reversely oblique patter, and FIG. 5C is a graph showing reproduction signals in the cases shown in FIGS. 5A and 5B. In FIG. 5C, a horizontal axis indicates a time and a vertical axis indicates amplitude of the reproduction signal. In FIG. 5C, (a) indicates the reproduction signal in the state in which the magnetic head 510 scans with no skew angle (FIG. 5A), and (b) indicates the reproduction signal in the state in which the magnetic head 510 scans with the skew angle (FIG. 5B).

As shown in FIG. 5C, because opposite angle shift influences emerge between a servo signal in which the forward oblique pattern is reproduced and a servo signal in which the reversely oblique pattern is reproduced, the relative angle shift can also be corrected between the head skew angle and the pattern angle using the two servo signals. However, when the servo pattern including the forward oblique pattern and the reversely oblique pattern is formed in the servo area 103, because an area of the servo area 103 is increased, improvement of recording density cannot be achieved in the hard disk.

In the magnetic recording apparatus of the embodiment, a center shift amount, i.e., a shift amount between the tracking center and the discrete track center is determined by reproducing the center shift amount detection information recorded in the center shift amount detection area 104 of the discrete area 101, and the correction information is determined. Therefore, the magnetic head can accurately be positioned with respect to the discrete track center while the magnetic recording can be performed with very high recording density, and the good recording and reproducing characteristics are obtained.

Figure 6:
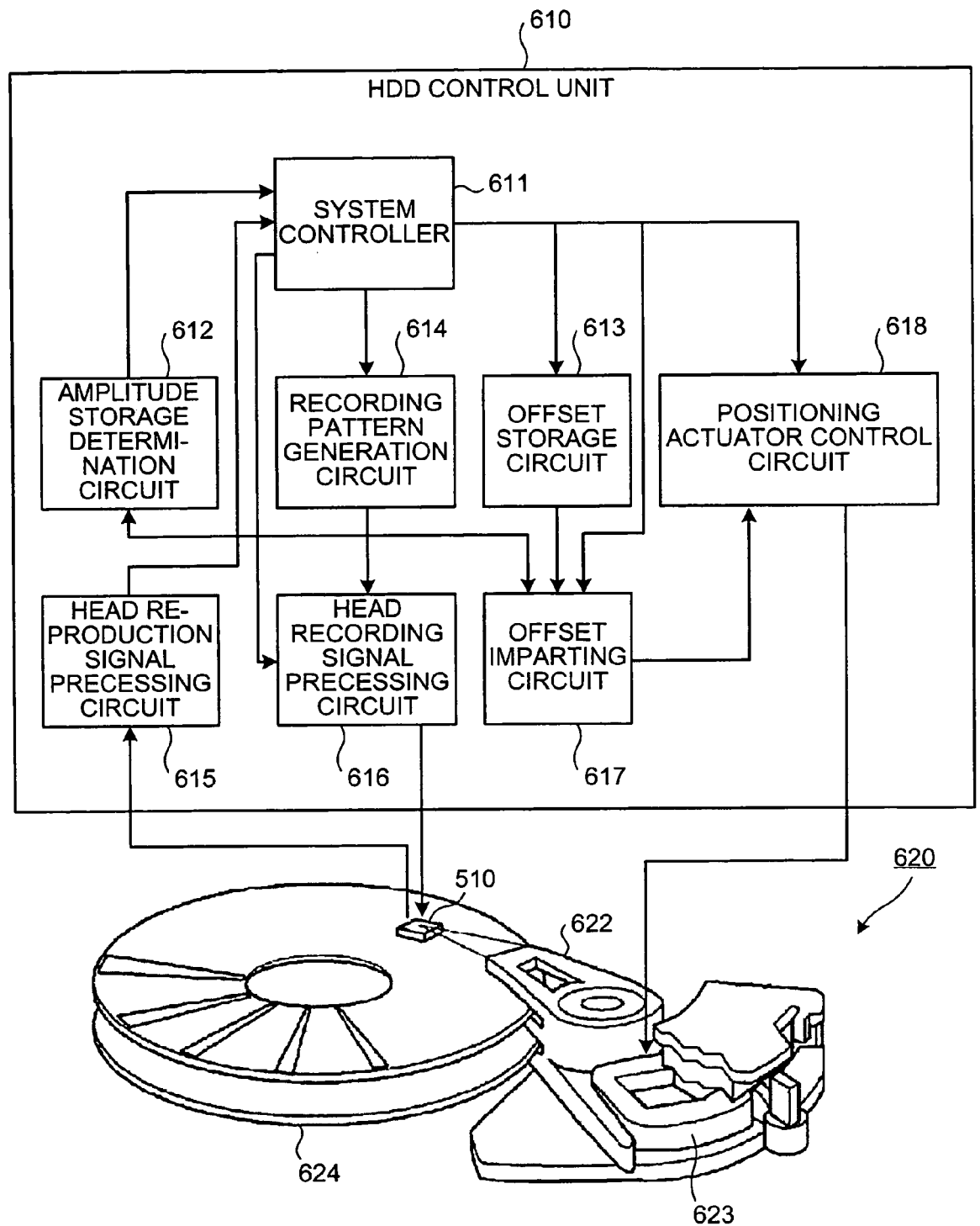
FIG. 6 is a block diagram showing a configuration of a hard disk drive of the embodiment.

Then, a configuration of the hard disk drive (HDD) of the embodiment will be described. FIG. 6 is a block diagram showing the configuration of the hard disk drive (HDD) of the embodiment. The hard disk drive (HDD) includes a hard disk (HD) 624, the magnetic head 510, a drive mechanism unit 620, and an HDD control unit 610. The drive mechanism unit 620 includes mechanisms such as a suspension arm 622. The HDD control unit 610 is provided as a control circuit on a printed board in the hard disk drive. The magnetic head 510 includes the recording head 511 and the reproducing head 512 as shown FIG. 3.

As shown in FIG. 6, the HDD control unit 610 includes a system controller 611, an amplitude storage determination circuit 612 (storage unit and determination unit), an offset storage circuit 613, a recording pattern generation circuit 614, a positioning actuator control circuit 618, a head reproduction signal processing circuit 615 (reproduction unit), a head recording signal processing circuit 616 (recording unit), and an offset imparting circuit 617.

The amplitude of the reproduction signal reproduced from the reproducing head 512 is stored in the amplitude storage determination circuit 612, and the amplitude storage determination circuit 621 determines the maximum amplitude. The maximum amplitude in each track is stored as an optimum offset amount in the offset storage circuit 613.

The recording pattern generation circuit 614 generates a recording pattern written in the hard disk. The positioning actuator control circuit 618 positions the reproducing head 512 and the recording head 511. When the data is recorded in the recording area by the recording head 511, the positioning actuator control circuit 618 receives the optimum offset amount from the offset imparting circuit 617 to move the magnetic head 510 by the received optimum offset amount in a radial direction of the hard disk. The head reproduction signal processing circuit 615 receives the reproduction signal from the reproducing head 512, and the head reproduction signal processing circuit 615 transfers the reproduction signal to the system controller 611. The head recording signal processing circuit 616 records the recording pattern signal, generated by the recording pattern generation circuit 614, in the hard disk using the recording head 511. The offset imparting circuit 617 transfers the optimum offset amount held by the offset storage circuit 613 to the positioning actuator control circuit 618.

The system controller 611 controls the amplitude storage determination circuit 612, the offset storage circuit 613, the recording pattern generation circuit 614, the positioning actuator control circuit 618, the head reproduction signal processing circuit 615, the head recording signal processing circuit 616, and the offset imparting circuit 617.

Figure 7:
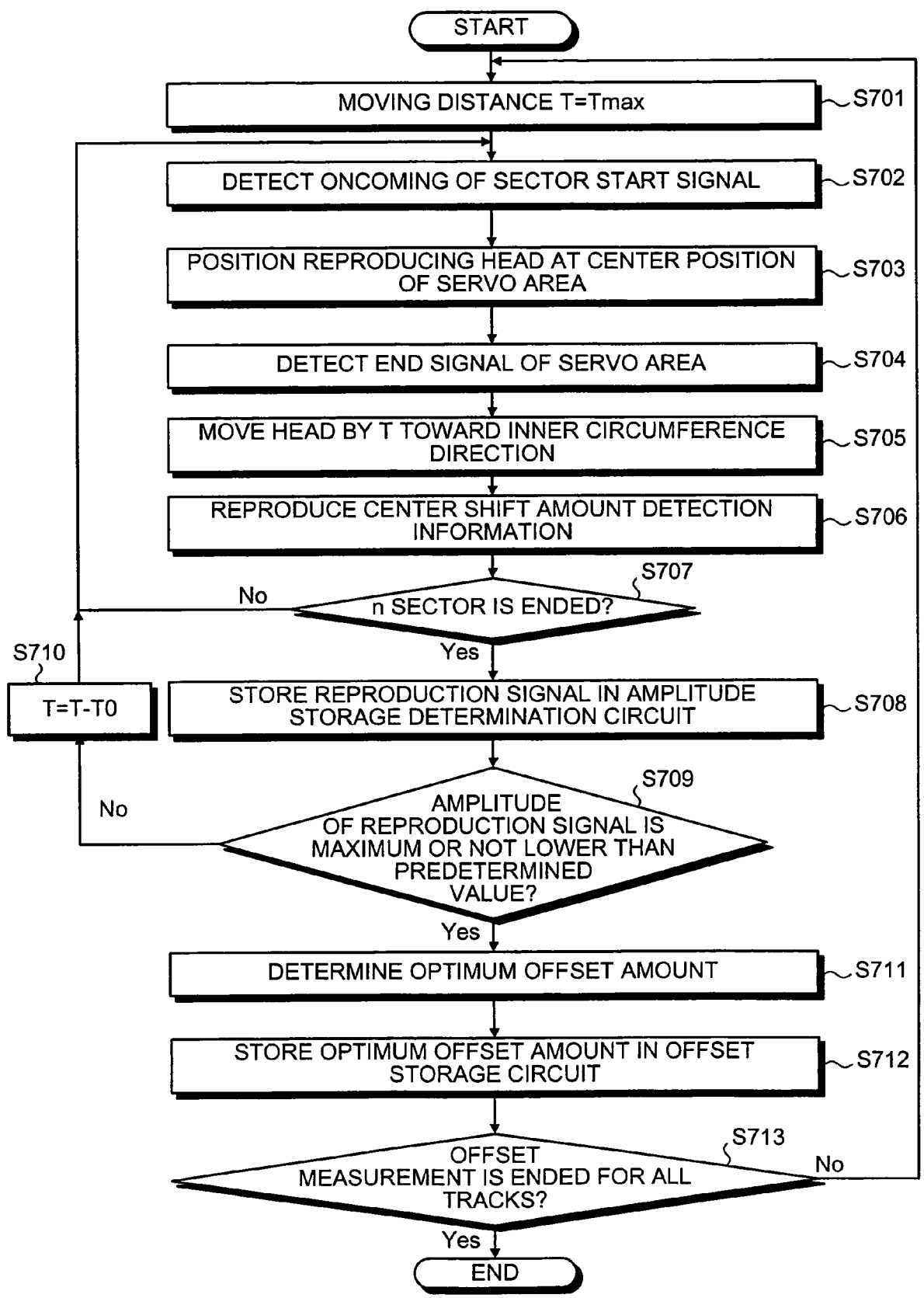
FIG. 7 is a flowchart showing an offset measurement process.

Then, an offset amount measurement process performed by the hard disk drive of the embodiment having the above configuration will be described. In the hard disk drive of the embodiment, a center shift amount measurement process is performed in the offset amount measurement process in which an embedded measurement pattern is used. FIG. 7 is a flowchart showing the offset measurement process.

In the offset amount measurement process of the embodiment, initialization is performed to the correction information recording area 102 where non-magnetic portion does not exist. The offset amount measurement process is started from a measurement start sector while magnetic information on the data is not written yet. In this state of things, a suspension arm 622 for supporting the magnetic head 510 on which the reproducing head 512 and the recording head 511 are mounted initializes T indicates moving distance of the magnetic head 510 in the radial direction to Tmax (Step S701). The head reproduction signal processing circuit 615 waits for oncoming of a sector area start signal while the magnetic head 510 is initialized to Tmax (Step S702). When the head reproduction signal processing circuit 615 receives the sector area start signal, the system controller 611 displaces a positioning actuator 623 to position the reproducing head 512 at the track center position of the servo area 103 based on the reproduction signal from the servo area 103 (Step S703).

Then, when the magnetic head 510 detects a flag signal for informing about the passage of the servo area 103 while passing through the servo area 103 of the measurement start sector (Step S704), the magnetic head 510 is moved by the distance T (Tmax in an initial time) toward the inner circumference direction from the track center position indicated by the reproducing head 512 (Step S705). FIG. 8 is an explanatory view showing the state in which the magnetic head 510 is moved toward the inner circumference direction by the distance Tmax from the track center position indicated by the reproducing head 512.

The magnetic head 510 may be moved in the outer circumference direction. The reproducing head 512 reproduces center shift amount detection information using the center shift amount detection area 104 provided in the discrete area 101 (Step S706).

Figure 9A:
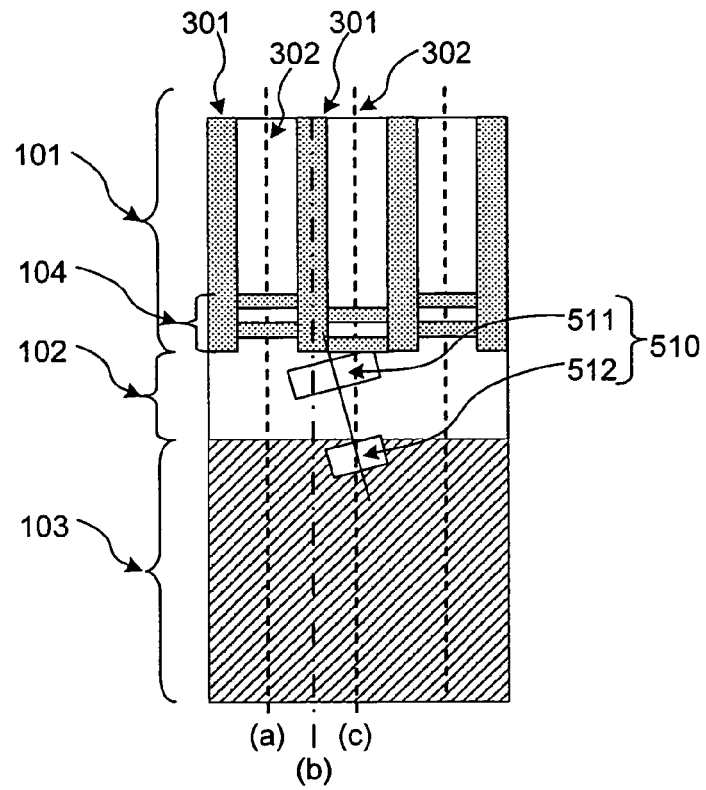
FIG. 9A is an explanatory view showing an example of signal processing in the case where center shift amount detection information is measured.
Figure 9B:
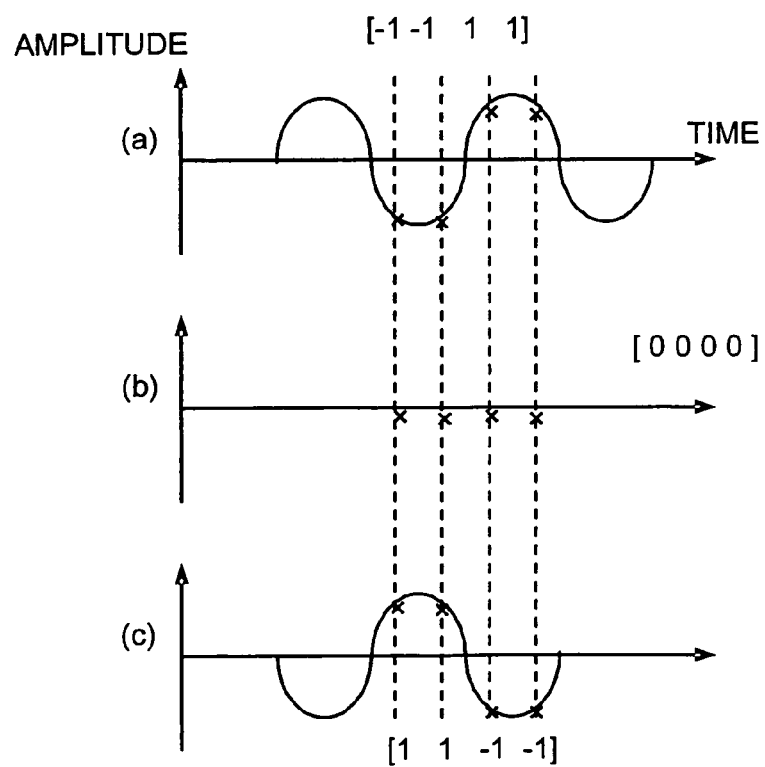
FIG. 9B is a graph showing amplitude of the reproduction signal of the center shift amount detection information.

FIG. 9A is an explanatory view showing an example of signal processing in the case where the center shift amount detection information is measured. The reproduction signal of the center shift amount detection information provided in the discrete area 101 is sampled at four points for each period of the reproduction signal. The sampled values are multiplied by sine wave coefficients (1, 1, −1, −1) respectively, and an amplitude detection value is set at the sum of the multiplied values. In the center shift amount detection information, the phases in the radial direction are shifted from each other by 180 degrees in the adjacent tracks, i.e., in the odd-number track and the even-number track. FIG. 9B is a graph showing the amplitude of the reproduction signal of the center shift amount detection information. Through the signal processing described above, a detection value of −4 is detected in the center of the track adjacent to the target track as shown in (a) of FIG. 9B, a detection value of 0 is detected in the middle of the adjacent track as shown in (b) of FIG. 9B, and a detection value of 4 is detected in the center of the target track as shown in (c) of FIG. 9B. This enables the detection sensibility to be improved when compared with the case where the adjacent pieces of center shift amount detection information are arranged while the phases are equal to each other. In the case where the adjacent pieces of center shift amount detection information are arranged while the phases are equal to each other, because the detection values of +4, 0, and +4 are obtained in the example shown in FIGS. 4A and 4B, there is a possibility that an incorrect determination is made in determining the detection value.

The signal amplitude measurement is finished by receiving a trigger signal generated slightly slower than the oncoming of the discrete area 101. The center shift amount detection measurement process from Step S702 to Step S706 is performed in each of predetermined n sectors (Step S707), and the measured values are stored in the amplitude storage determination circuit 612 as the amplitude data when the center shift amount is divided into T toward the inner circumference side (Step S708). The previous center shift amount stored in the amplitude storage determination circuit 612 is compared to the current center shift amount in each sector, and it is determined whether the maximum amplitude of the current center shift amount is detected or not in all the sectors (Step S709). When the maximum amplitude is not detected, letting T=T−T0 (Step S710), the process from Step S702 to Step S708 is repeated. Therefore, the magnetic head 510 is moved by the distance T0 toward the disk outer circumference side from the state in which the magnetic head 510 is moved by the distance T toward the disk inner circumference side, and the center shift amount detection measurement process from Step S702 to Step S708 is performed.

Figure 10:
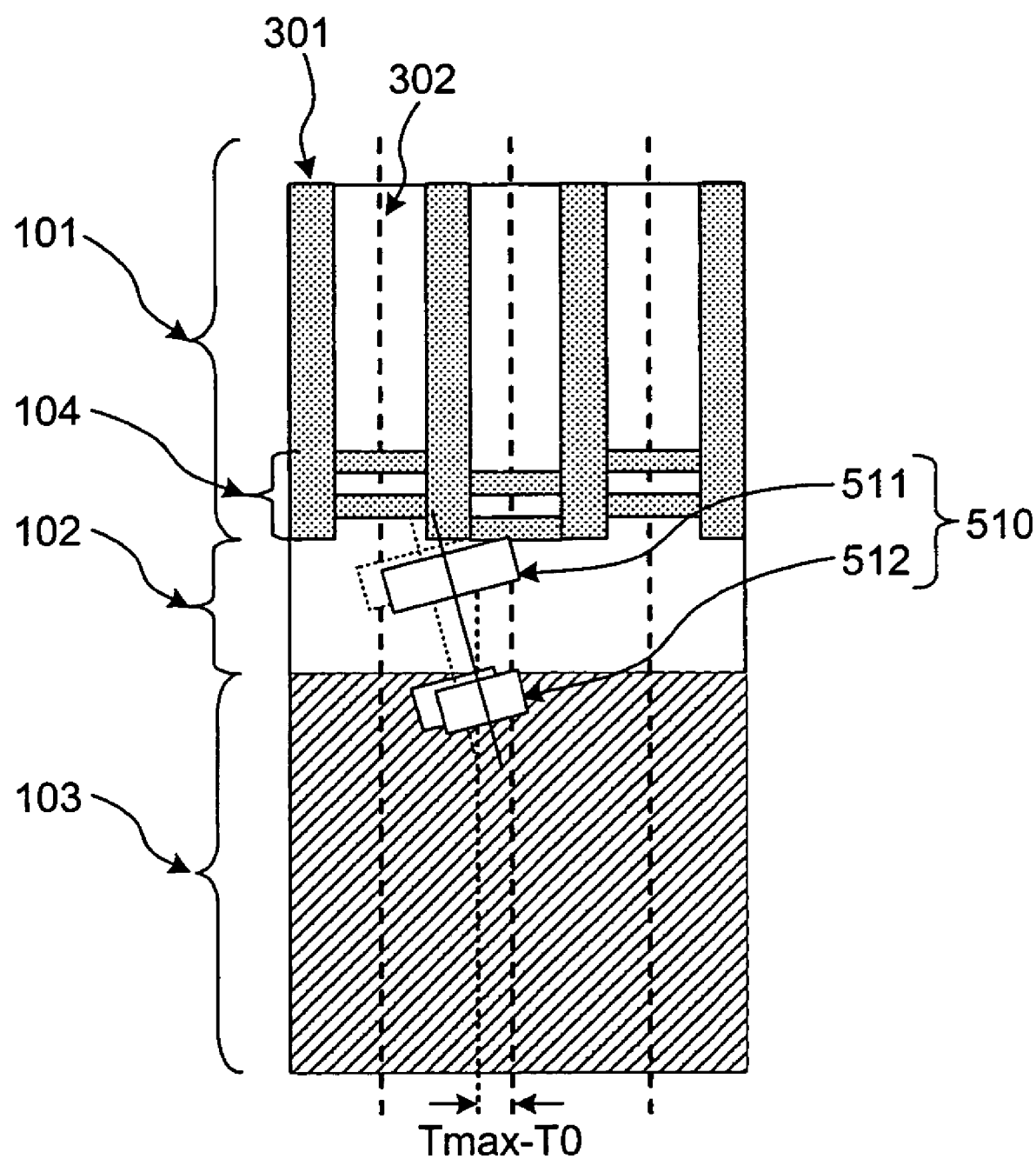
FIG. 10 is an explanatory view showing a state in which the magnetic head is moved by T0 toward an outer circumference direction from the position where the magnetic head is moved by the distance Tmax toward the inner circumference direction from the track center.

FIG. 10 is an explanatory view showing the state in which the magnetic head 510 is moved by T0 toward the outer circumference direction from the position where the magnetic head 510 is moved by the distance Tmax toward the inner circumference direction from the track center.

Figures 11, 12:
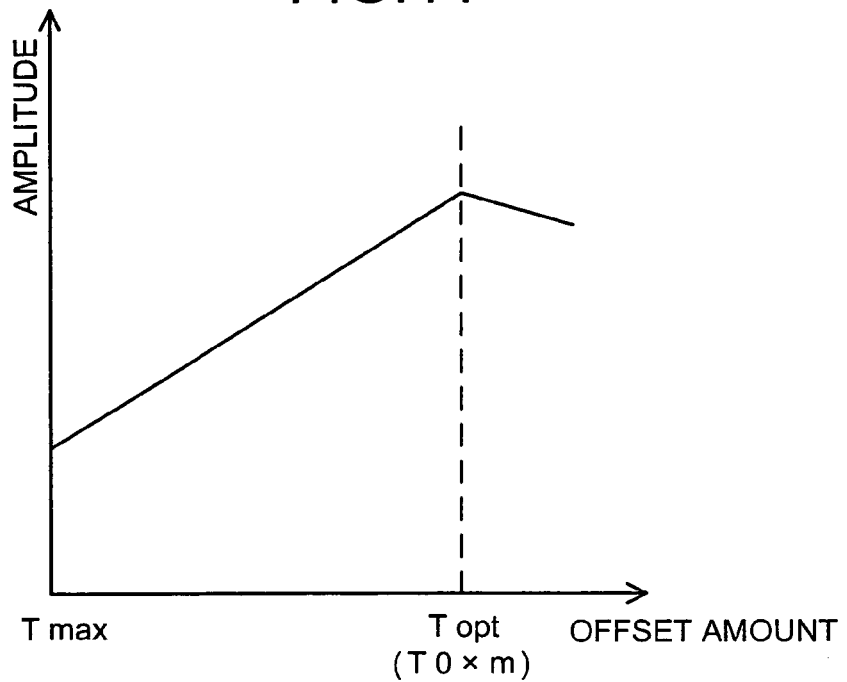
FIG. 11 is a graph showing a relationship between an offset amount and amplitude.
FIG. 12 is an explanatory view showing an example of a table of an optimum offset amount in each track, which is stored in an offset storage circuit.

FIG. 11 is a graph showing the center shift amount obtained through the center shift amount detection measurement process for the amplitude data in one sector. As shown in FIG. 11, when the magnetic head 510 is gradually changed toward the outer circumference side from the state in which the center shift amount is set at Tmax toward the inner circumference side, the center shift amount having an inflection point at which the measured amplitude value becomes the maximum is obtained, or the amplitude becomes not lower than a predetermined value, and the measurement is ended. The amplitude storage determination circuit 612 detects based on the amplitude data stored the center shift amount, in which the amplitude becomes the maximum or becomes not lower than the predetermined value, to correct the offset amount which is of the correction information by the optimum center shift amount.

That is, the magnetic head 510 is gradually moved by the distance T0 toward the disk outer circumference side to reproduce the pattern of the center shift amount detection area 104, and the position at which the maximum amplitude of the current center shift amount is detected is the position of the discrete track center.

Accordingly, in Step S709, when the amplitude storage determination circuit 612 determines that the amplitude the current center shift amount becomes the maximum or becomes not lower than the predetermined value, it is determined that the value in which the current offset amount is corrected by the center shift amount is an optimum offset amount Topt in the track which is currently processed (Step S711), and the optimum offset amount Topt is stored in the offset storage circuit 613 (Step S712).

Thus, the optimum offset amount is determined in one track, and the measurement process from Step S701 to Step S712 is performed for all the tracks to measure the optimum offset amounts in all the tracks. FIG. 12 is an explanatory view showing an example of a table stored in the offset storage circuit 613. In the table, the optimum offset amounts are listed in all the tracks. Thus, in each sector in each track, the optimum offset amount is stored in the offset storage circuit 613.

Figure 13:
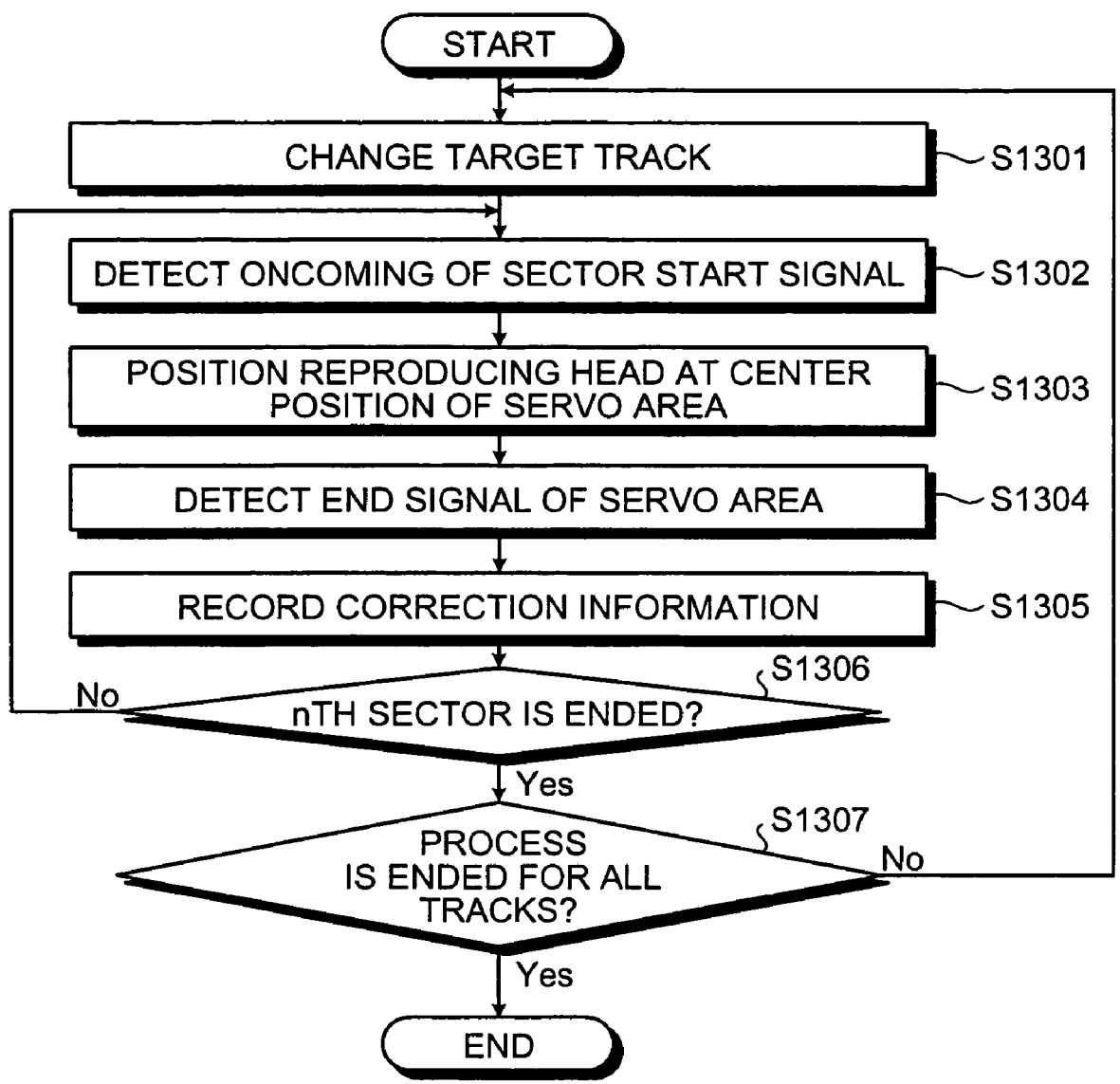
FIG. 13 is a flow chart showing a positioning correction information recording process.

Then, a positioning correction information recording process performed by the hard disk drive of the embodiment will be described. FIG. 13 is a flow chart showing the positioning correction information recording process.

In the positioning correction information recording process of the embodiment, the initialization is performed to the correction information recording area 102 where non-magnetic portion does not exist. The positioning correction information recording process is started from the recording start sector while magnetic information on the data is not written yet. The target track at which the magnetic head 510 is positioned is set first (Step S1301). When the system controller 611 receives the oncoming of the recording start sector (Step S1302), the reproducing head 512 is positioned at the track center position indicated by the servo area 103 (Step S1303).

Then, the system controller 611 detects the end of the servo signal from the head reproduction signal processing circuit 615 (Step S1304), the system controller 611 records the pattern of the positioning correction amount in the continuously oncoming correction information recording area 102 having the magnetic material using the recording head 511 (Step S1305).

At this point, the recording pattern of the positioning correction amount is a bit pattern which is changed at predetermined frequencies, and the bit pattern frequency is desirably equal to the servo signal frequency. A filter circuit process can easily be added by setting the bit pattern and the servo signal at the same frequency.

Figure 14:
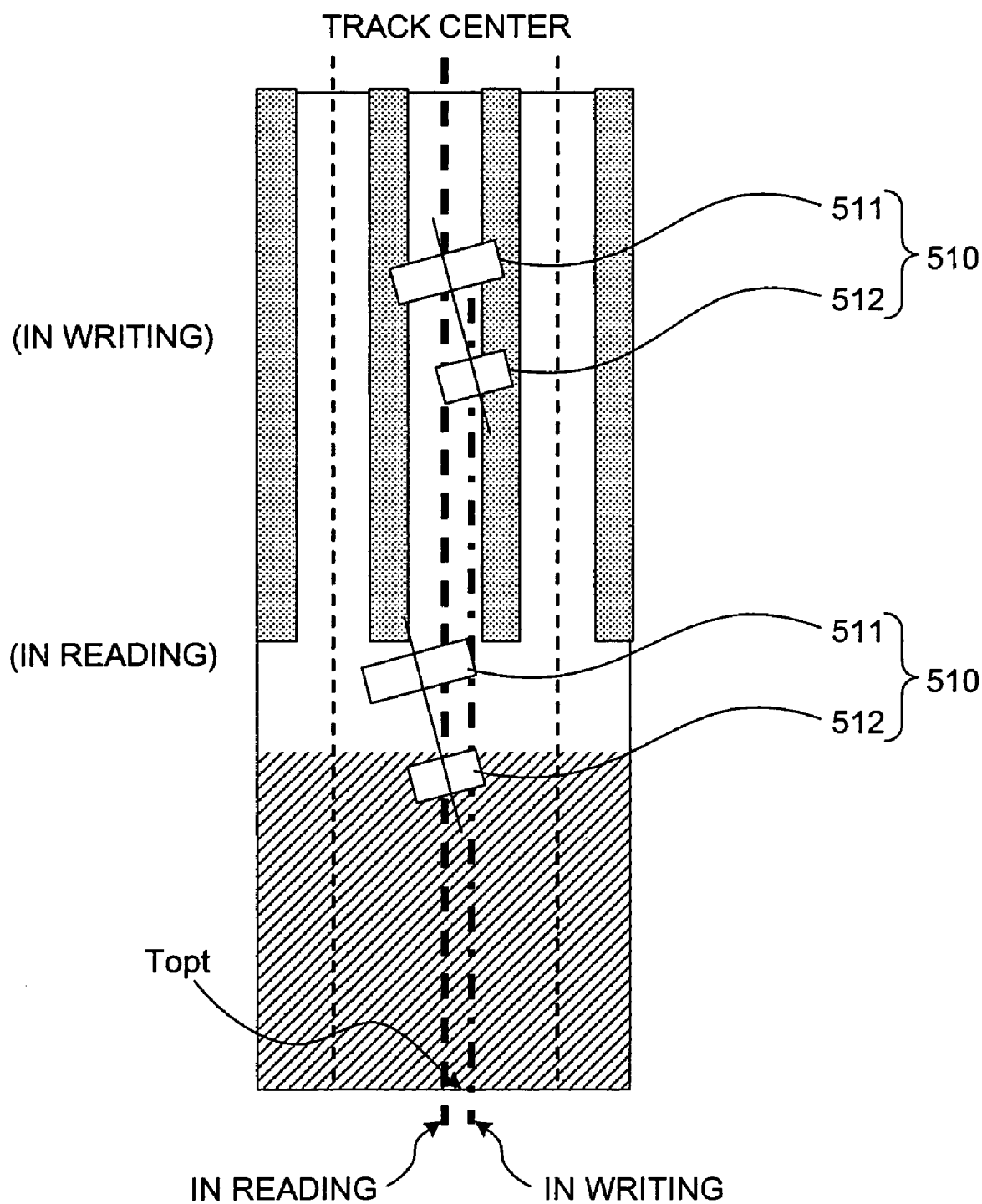
FIG. 14 is a schematic view showing a positional relationship of the reproducing head and a recording head with respect to the discrete area.

The bit pattern constituting the pattern of the positioning correction amount includes a correction amount during reproducing head positioning (first correction information) and a correction amount during recording head positioning (second correction information). As shown in FIG. 14, when the magnetic head 510 is coaxial with the suspension arm 622, the suspension arm 622 is rotated about a bearing shaft. With reference to the positional relationship of the reproducing head 512 and the recording head 511 relative to the discrete area, the center position of the recording head 511 is shifted from the track center, when the center of the reproducing head 512 is positioned with respect to the track center by the skew angle which is of the oblique angle of the magnetic head 510. Therefore, the case where the reproducing head 512 is positioned at the discrete track center differs from the case where the recording head 511 is positioned at the discrete track center in the positioning correction amount. The offset amount is measured by the recording head positioning offset amount measurement process in the discrete track, and the measured offset amount is set at the recording head the positioning correction amount.

Accordingly, the offset amount which is held as a reproducing head positioning correction amount by the offset storage circuit 613 is set the recording head offset amount at a recording head positioning correction amount. The positioning correction amount recorded in the correction information recording area 102 becomes a bit string determined by an offset instruction amount for positioning resolution. Accordingly, the correction information recording area 102 is determined by the number of bit strings constituting the maximum offset instruction amount.

At this point, in the positioning correction amount, the $(m+1)^{th}$ positioning correction amount is recorded in the $m^{th}$ sector in which the correction information is measured. Therefore, in controlling the positioning correction of the sector, the positioning correction can rapidly be performed by previously reading the positioning correction amount when the positioning control is performed in the previous sector.

The positioning correction amount is recorded in one sector by the above-described way, and the measurement process from Step S1301 to Step S1305 is performed to all the sectors and tracks (Steps S1306 and S1307). Accordingly, the positioning correction information is recorded in all the sectors and tracks.

Then, a positioning correction process performed by the hard disk drive of the embodiment will be described. Similarly to the servo signal, the head reproduction signal processing circuit 615 receives the reproduction signal from the reproducing head 512, and the positioning correction amount recorded in the correction information recording area 102 is transferred to the system controller 611. The positioning correction information amount recorded in the $m^{th}$ sector is decoded in performing the positioning control of the $m^{th}$ sector, and the positioning correction information amount is reflected in performing the positioning control of the $(m+1)^{th}$ sector. In this case, reproducing head positioning correction amount is applied when the reproducing head is positioned at the discrete track center, and the recording head positioning correction amount is applied when the recording head is positioned at the discrete track center. Thus, the magnetic head is moved by the optimum offset amount toward the radial direction to perform the positioning, which allows the data write and read to be appropriately performed to the discrete track.

In the case where the maximum amplitude of the data stored in the amplitude storage determination circuit 612 is smaller than the predetermined amplitude, there is a possibility that the offset amount does not reach the optimum offset amount. In this case, the amplitude storage determination circuit 612 determines whether the offset amount reaches the optimum offset amount or not, the positioning correction information recording process is started from the recording start sector again, and the offset amount measurement process can be also performed again. The offset amount in the recording start sector is set larger than the offset amount Tmax in starting the previous recording process.

As described above, the correction information recording area 102 is provided in the hard disk of the embodiment, the correction information recording area 102 has the magnetic material in which the data can be written, and the non-magnetic area may be neglected. Further, the pattern of the center shift amount detection area 104 is provided in the discrete area 101 subsequent to the correction information recording area 102, and the center shift amount detection area 104 is formed in the checkered pattern while the phases of the center shift amount detection area 104 are shifted from each other by 180 degrees between the adjacent tracks. Therefore, in the discrete track type hard disk, the track center shift amount is accurately measured, and the measured offset amount can be corrected to perform the positioning control. Accordingly, the magnetic recording can be performed to the track center position of the discrete area 101 during the data write, and the signal reproduction can be performed to the track center position of the discrete area 101 during the data read. Further, the discrete action is effectively exerted without degrading the reproduction signal, and the good recording and reproducing characteristics can be obtained while the magnetic recording can be performed with very high recording density.

In the hard disk of the embodiment, the correction information recording area 102 is provided between the servo area 103 and the discrete area 101, the positioning correction amount of the subsequent sector is recorded in the correction information recording area 102, and the positioning correction amount for controlling the next sector can previously be decoded. Therefore, the magnetic head positioning correction can rapidly be performed.

In the magnetic recording apparatus of the embodiment, the pattern of the center shift amount detection information of the center shift amount detection area 104 is read by the reproducing head 512 while the magnetic head 510 is moved by the predetermined distance in the radial direction from the position at which the magnetic head 510 is positioned, the movement of the magnetic head 510 and the read of the center shift amount detection information are performed plural times, and the maximum amplitude of the plural pieces of measurement data stored in the amplitude storage determination circuit 612 is determined as the optimum offset amount. Therefore, in the discrete track type hard disk, the measured positioning correction amount can be recorded in the correction information recording area 102 where the non-magnetic material portion does not exist, and the recording and reproduction can be performed at the accurate position by performing the offset correction positioning control.

In the hard disk of the embodiment, although the center shift amount detection area 104 is formed in each sector, the invention is not limited to the configuration of the embodiment. Alternatively, for example, the center shift amount detection area 104 may be provided only in the sectors in which the offset amount can be measured according to the accuracy of the performance of the positioning correction.

In the hard disk of the embodiment, although the center shift amount detection area 104 is formed in each track, the invention is not limited to the configuration of the embodiment. Alternatively, for example, the center shift amount detection area 104 may be provided only in predetermined tracks. In this case, the hard disk drive may be configured such that the optimum offset amounts for the tracks except for the track in which the optimum offset amount is measured are computed by performing an interpolation process from already known optimum offset amount.

In the hard disk of the embodiment, the center shift amount detection information is measured for each track to record the positioning correction amount in the correction information recording area 102. However, the invention is not limited to the configuration of the embodiment. Alternatively, for example, the measured correction information may be recorded in the correction information recording area 102 as the common value in each zone which is of an averaged predetermined area.

Figure 15:
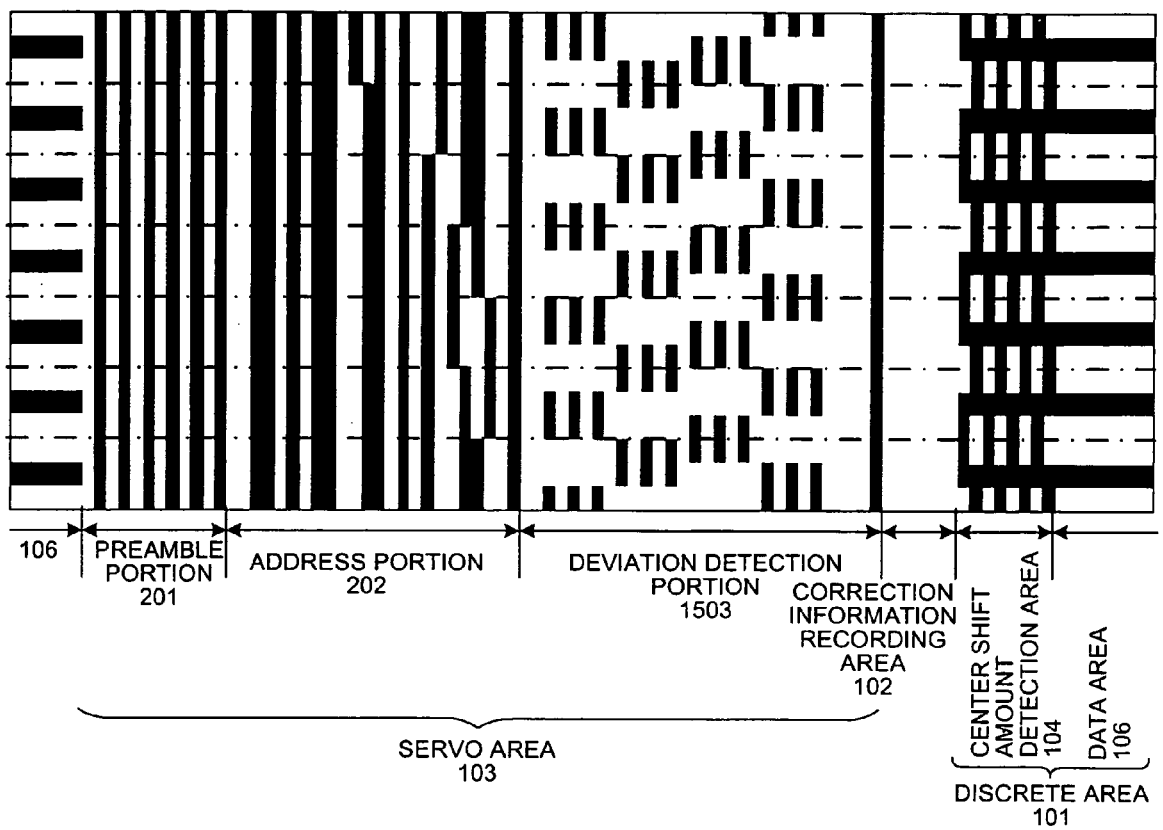
FIG. 15 is a schematic view showing a detailed structure of a discrete area and a servo area in a hard disk of a first modification of the embodiment.

In the hard disk of the embodiment, although the deviation detection unit of the servo area 103 is formed in the uniform pattern oblique to the preamble unit, the invention is not limited to the configuration of the embodiment. The invention can also be applied to the case in which the deviation detection unit is formed in the burst type servo pattern. FIG. 15 shows the detailed structure of the servo area 103 in the case where a deviation detection portion 1503 is formed by the burst type servo pattern including four phases. In this case, because the hard disk drive has the same configuration as the above embodiment, the offset amount measurement process (including center shift amount detection process), the positioning correction information recording process, and the positioning correction process are performed in the same way as the embodiment.

Figure 16:
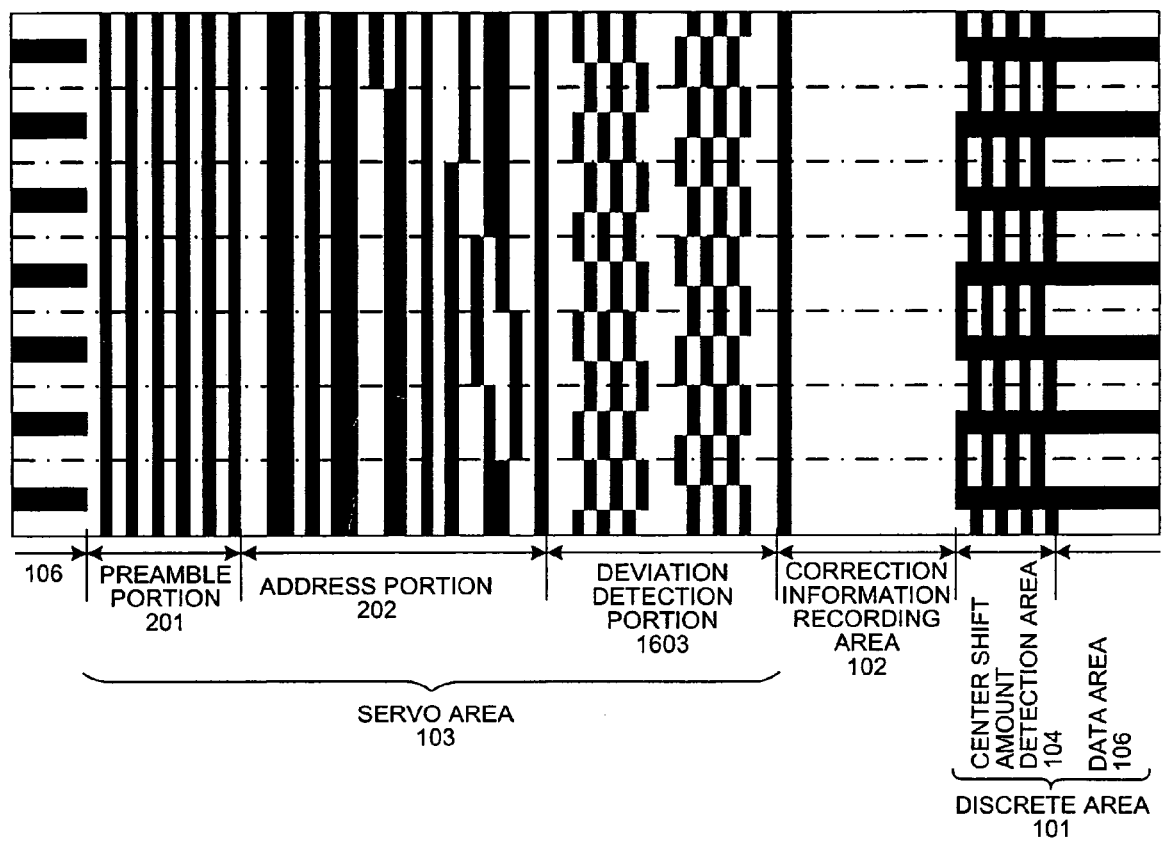
FIG. 16 is a schematic view showing a detailed structure of a discrete area and a servo area in a hard disk of a second modification of the embodiment.

The invention can also be applied to the case in which the deviation detection unit of the servo area 103 is formed in the Null pattern type servo pattern. FIG. 16 shows the detailed structure of the servo area 103 in the case where a deviation detection portion 1603 is formed by the Null pattern type servo pattern including a two-phase Null pattern. In this case, because the hard disk drive has the same configuration as the above embodiment, the offset amount measurement process (including center shift amount detection process), the positioning correction information recording process, and the positioning correction process are performed in the same way as the embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording apparatus comprising:
a composite magnetic head which includes a recording head and a reproducing head; and
a magnetic storage medium in which data is recorded, including,
a discrete area, having a plurality of tracks and a non-magnetic area between adjacent tracks, the tracks having a magnetic recording area where data can be written by the recording head, the data not being able to be written in the non-magnetic area by the recording head in the non-magnetic area,
a correction information recording area, positioning correction information being able to be written in the correction information recording area used for positioning either the recording head or the reproducing head at each track center, and
a center shift amount detection area, center shift amount detection information being previously recorded in the center shift amount detection area, the center shift amount detection information being for measuring a center shift amount which indicates a relative distance between a tracking center and an actual track center of the discrete area when either the recording head or the reproducing head is positioned at a track center,
wherein the center shift amount detection area is provided in the discrete area.

2. The magnetic recording apparatus according to claim 1, wherein the correction information recording area is provided over a radial direction of the magnetic storage medium.

3. The magnetic recording apparatus according to claim 2, wherein the magnetic storage medium further includes a servo area in which position information for positioning the composite magnetic head is recorded, and the correction information recording area is provided between the servo area and the discrete area.

4. The magnetic recording apparatus according to claim 3, wherein the servo area includes
a preamble portion in which information for synchronizing a clock of a reproduction signal is recorded;
an address portion in which information on a cylinder is recorded; and
a deviation detection portion in which detection information for detecting an off-track amount of the composite magnetic head is recorded.

5. The magnetic recording apparatus according to claim 4, wherein the detection information in the deviation detection portion is recorded with a pattern oblique to an information recording pattern of the preamble portion.

6. The magnetic recording apparatus according to claim 5, wherein the correction information recording area and the center shift amount detection area are provided in each sector area constituting the track.

7. The magnetic recording apparatus according to claim 1, wherein the center shift amount detection information is recorded in the center shift amount recording area while phases in the radial direction of an odd-number track and an even-number track are shifted from each other by 180 degrees.

8. The magnetic recording apparatus according to claim 1, wherein the positioning correction information is recorded in the correction information recording area, the positioning correction information having first correction information for positioning the reproducing head at each track center position.

9. The magnetic recording apparatus according to claim 8, wherein the positioning correction information has second correction information for positioning the recording head at each track center position.

10. The magnetic recording apparatus according to claim 9, wherein the second correction information includes an offset amount indicating a relative distance in a radial direction between the reproducing head and the recording head.

11. The magnetic recording apparatus according to claim 9, further comprising:
a reproduction unit which reads the center shift amount detection information with the reproducing head while the reproducing head is moved by a predetermined distance in the radial direction from a position where the reproducing head is positioned at a predetermined track; and
a determination unit which determines the positioning correction information based on the center shift amount detection information which is read a plurality of times by moving the reproducing head and the recording head.

12. The magnetic recording apparatus according to claim 11, wherein the positioning correction information is recorded in the correction information recording area of a sector immediately before a sector where the positioning correction information is determined by the determination unit.

13. The magnetic recording apparatus according to claim 11, wherein an average value of pieces of the positioning correction information determined in the tracks within a predetermined area is recorded in the correction information recording area in the form of the common positioning correction information in the predetermined area.

14. A positioning correction method comprising:
reading center shift amount detection information with a reproducing head while a reproducing head is moved by a predetermined distance in a radial direction from a position where the reproducing head is positioned at a predetermined track in a discrete track type magnetic storage medium, the discrete track type magnetic storage medium including a discrete area, a correction information recording area, and a center shift amount detection area, the discrete area having a plurality of tracks and a non-magnetic area between the adjacent tracks, the track having a magnetic recording area where data can be written by the recording head, the data not being able to be written in the non-magnetic area by the recording head in the non-magnetic area, positioning correction information being able to be written in the correction information recording area when either the recording head or the reproducing head is positioned at each track center, center shift amount detection information being previously recorded in the center shift amount detection area, the center shift amount detection information for measuring a center shift amount which is of a relative distance between a tracking center and an actual track center of the discrete area when either the recording head or the reproducing head is positioned at each track center; and moving the reproducing head and the recording head and reading the center shift amount detection information a plurality of times, and determining the positioning correction information based on the center shift amount detection information read, wherein the center shift amount detection area is provided in the discrete area.

\* \* \* \* \*